(12) United States Patent
Dreer

(10) Patent No.: US 9,192,106 B2
(45) Date of Patent: Nov. 24, 2015

(54) COMPRESSION ROLL HOUSING

(75) Inventor: Constantin Dreer, Illertissen (DE)

(73) Assignee: AGCO GmbH, Marktoberdorf (DE)

( * ) Notice: Subject to any disclaimer, the term of this patent is extended or adjusted under 35 U.S.C. 154(b) by 762 days.

(21) Appl. No.: 13/500,975

(22) PCT Filed: Oct. 8, 2010

(86) PCT No.: PCT/IB2010/002552
§ 371 (c)(1),
(2), (4) Date: Jul. 3, 2012

(87) PCT Pub. No.: WO2011/042803
PCT Pub. Date: Apr. 14, 2011

(65) Prior Publication Data
US 2012/0266581 A1 Oct. 25, 2012

(30) Foreign Application Priority Data
Oct. 9, 2009 (GB) .................. 0917734.6

(51) Int. Cl.
| B30B 3/04 | (2006.01) |
| A01F 29/10 | (2006.01) |
| A01D 43/10 | (2006.01) |
| A01D 82/02 | (2006.01) |
| A01D 43/08 | (2006.01) |

(52) U.S. Cl.
CPC .............. *A01F 29/10* (2013.01); *A01D 43/088* (2013.01); *A01D 43/107* (2013.01); *B30B 3/04* (2013.01); *Y10T 29/49448* (2015.01); *Y10T 29/49826* (2015.01)

(58) Field of Classification Search
CPC ........... B30B 3/005; B30B 3/04; A01F 29/10; A01D 43/088; A01D 43/107
USPC .............. 100/155 R, 158 R, 159, 161, 162 R, 100/163 R, 168, 169, 174, 176; 56/16.4 B, 56/16.4 C, 16.4 D, 16.4 R, 249.5; 29/428, 29/891
See application file for complete search history.

(56) References Cited

U.S. PATENT DOCUMENTS

| 2,235,918 A |   | 3/1941 | Amedee |
| 2,653,063 A | * | 9/1953 | Arndt et al. .................. 384/536 |

(Continued)

FOREIGN PATENT DOCUMENTS

| DE | 2554661 A1 | 6/1976 |
| DE | 2850476 A1 | 5/1980 |

(Continued)

OTHER PUBLICATIONS

International Search Report for International Application No. PCT/IB2010/002552 Dated Feb. 15, 2011.
Great Britian Search Report for Great Britian Application No. 0917734.6 Dated Feb. 10, 2010.

*Primary Examiner* — Jimmy T Nguyen

(57) ABSTRACT

A compression roll housing for an agricultural machine having opposing front and rear ends for connection to parts of the machine, an upper and a lower panel and two opposing side panels. Each of said side panels is provided with at least one substantially vertical elongated aperture for receiving a shaft of a compression roll. Each of the side panels is also provided with a horizontal aperture which extends across the at least one elongated aperture to the front or rear end of the housing.

4 Claims, 3 Drawing Sheets

(56) References Cited

U.S. PATENT DOCUMENTS

| | | | |
|---|---|---|---|
| 3,220,658 A * | 11/1965 | Shelton, Jr. | 241/32 |
| 3,431,712 A | 3/1969 | Probsting | |
| 3,881,663 A * | 5/1975 | Brown | 241/225 |
| 4,196,861 A | 4/1980 | Bass et al. | |
| 6,062,010 A * | 5/2000 | Kraus et al. | 56/16.4 R |
| 6,499,283 B1 | 12/2002 | Cook | |
| 6,955,034 B1 * | 10/2005 | Blakeslee et al. | 56/16.4 C |
| 2007/0137160 A1 * | 6/2007 | Schafer | 56/60 |

FOREIGN PATENT DOCUMENTS

| | | |
|---|---|---|
| DE | 3202496 A1 | 8/1983 |
| DE | 3539909 A1 | 10/1986 |
| DE | 19539143 A1 | 4/1997 |
| EP | 1790210 A2 | 5/2007 |
| EP | 1797753 A2 | 6/2007 |
| GB | 1094160 A | 12/1967 |
| GB | 2040660 A | 9/1980 |

* cited by examiner

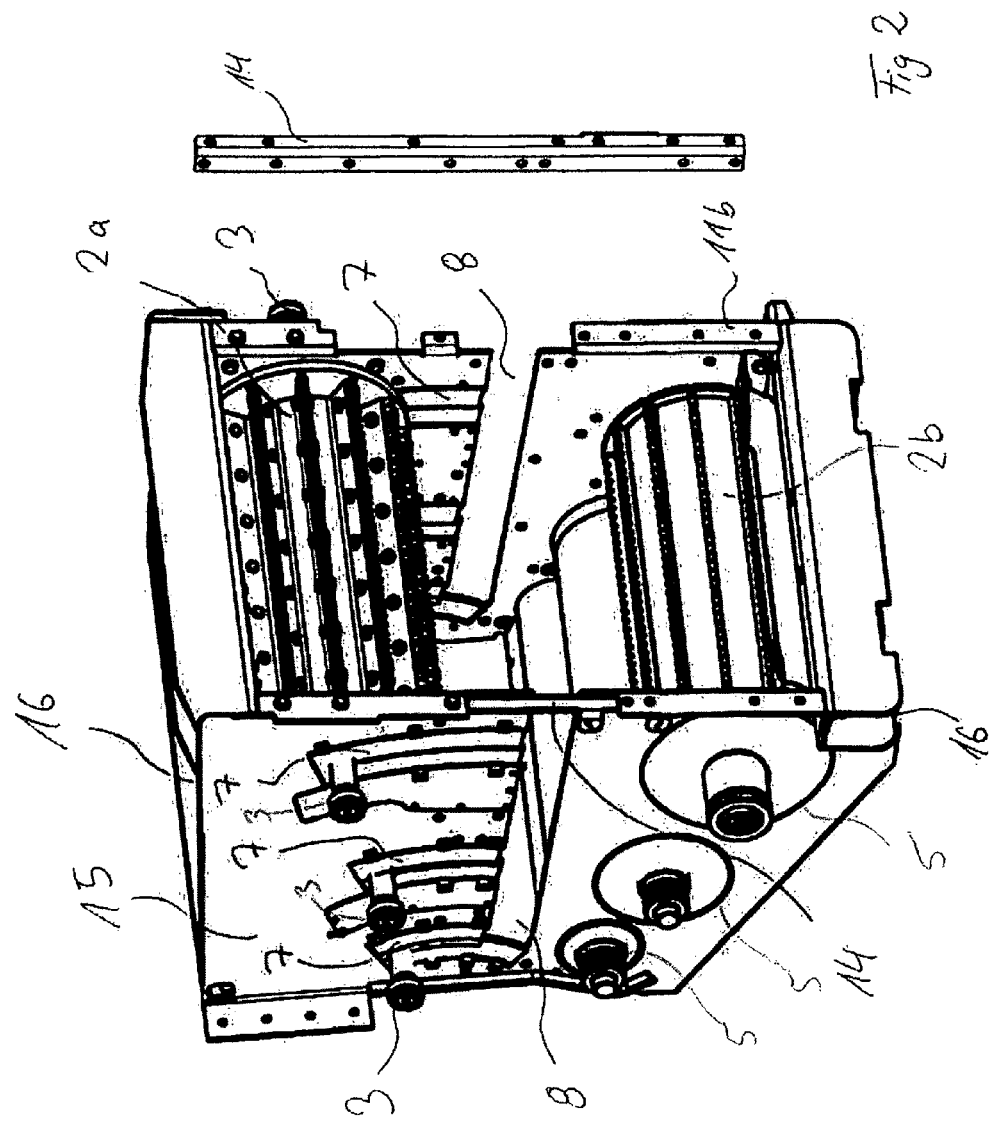

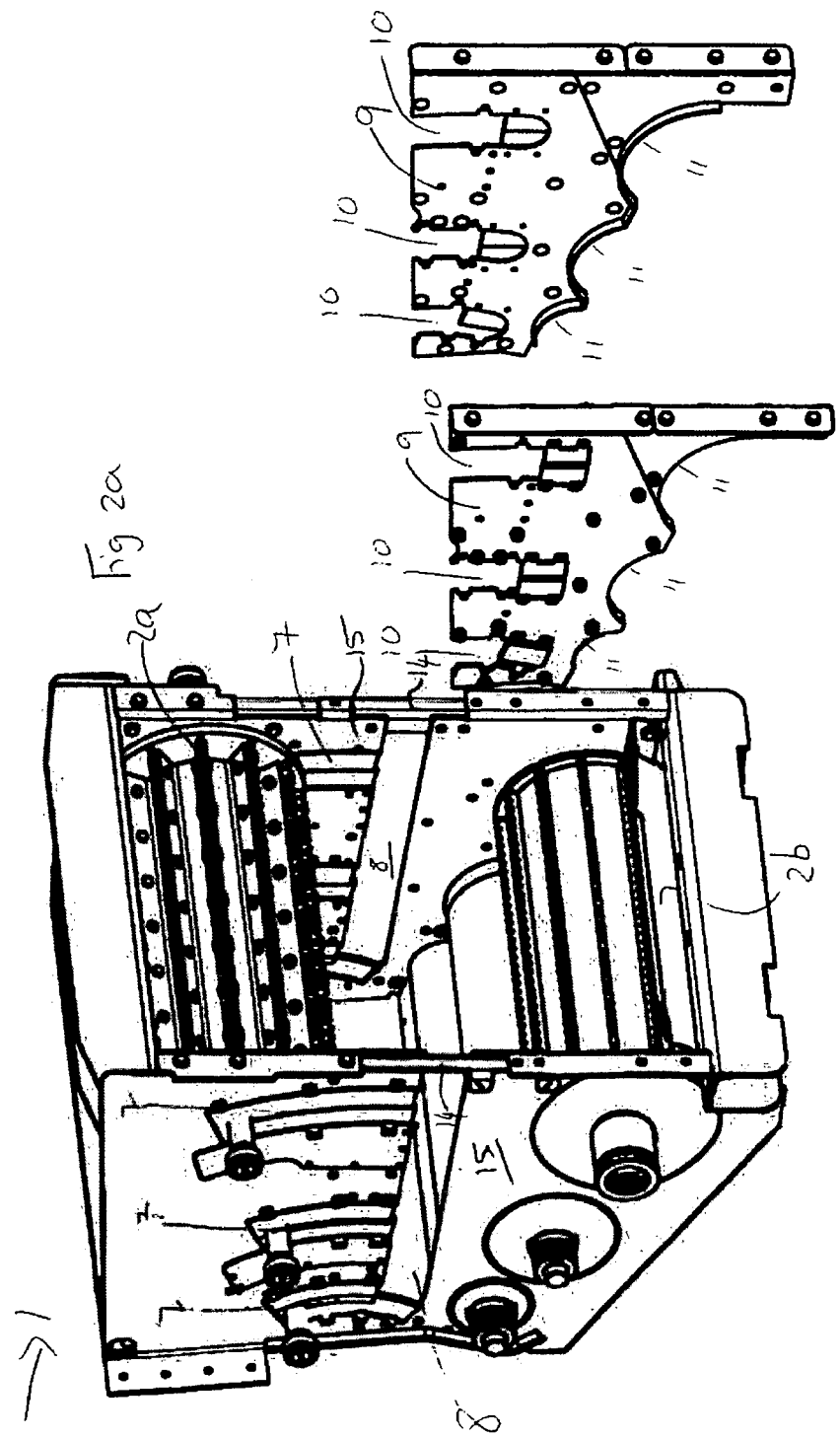

COMPRESSION ROLL HOUSING

BACKGROUND OF THE INVENTION

1. Field of Invention

This invention relates to a roll housing on an agricultural machine. More specifically it relates to a compression roll housing on a harvesting machine, for example, a forage harvester. The invention also relates to a method of mounting and/or removing rolls to/from a compression roll housing.

2. Description of Related Art

A forage harvester has a front attachment which includes a front cutter and a mechanism for feeding the cut crop to compression rolls where it is compressed. The compressed crop is then fed to a further part of the machine where it is cut by cutters before being fed into a discharge chute.

The compression rolls which each comprise a drum and a shaft are contained within a compression roll housing. Typically, three sets of rolls are arranged in pairs, each set having an upper and lower roll so that the crop is fed and compressed between each set. The housing comprises apertures so that the rolls can be mounted within the housing with the shafts protruding through the apertures. The shafts of the upper set of rolls are mounted within curved longitudinal apertures which extend vertically down the sides of the housing.

A compression roll housing typically comprises an upper and a lower panel which are connected by welding, or other permanent connection means to two opposing side panels. The front and rear ends of the housing are left open for connection to a front attachment and further part of the machine respectively.

The shafts of the upper rolls are also attached to two carriers and the carriers are pivotably mounted to the roll housing.

It is very awkward to mount the upper rolls to the roll housing and attach them to the carriers and to attach the carriers to the roll housing. Therefore, it is desirable to pre-assemble the upper rolls to the carriers before mounting the upper rolls and carriers to the roll housing.

When it is necessary to mount or remove upper rolls and carriers from the housing, for example, for repair or exchange, the upper panel of the housing may be removed and a crane used to lift the upper rolls to/from the housing. Given that the upper panel may be permanently connected to the two side panels this can be difficult and time consuming. Further, since the driver's cabin on a forage harvester is situated above the roll housing, it is not always practical to use a crane to access the housing within the machine and as such the whole housing must be removed from the forage harvester in order to remove or mount the upper rolls and carriers.

It may be possible to access the upper rolls sideways through the side panels but this is not simple because the side panels are attached to other parts of the housing and therefore the carriers have to be disassembled to ensure that only the rolls are moved through apertures in the side panels. Since the front wheels of a forage harvester restrict access from the side of the machine, the complete housing is often removed from the machine to enable a roll to be removed/fitted to the housing.

To remove the housing from the machine, mount and/or remove a roll in the housing and then replace the housing back onto the machine is very time consuming.

OVERVIEW OF THE INVENTION

It is an object of the present invention to provide a compression roll housing for an agricultural machine in which an upper roller may be mounted and/or removed to/from the housing whilst the housing is in the machine.

It is a further object of the invention to provide a method of mounting and/or removing rolls to/from a compression roll housing.

According to the invention there is provided a compression roll housing for an agricultural machine having opposing front and rear ends for connection to parts of the machine, an upper and a lower panel and two opposing side panels, each of said side panels provided with at least one substantially vertical elongated aperture for receiving a shaft of a compression roll and a horizontal aperture which extends across the at least one elongated aperture to the front or rear end of the housing.

In this respect an upper, or lower compression roll including carriers can be mounted and removed from the housing through the front end of the housing by positioning the shaft of the roll between the horizontal apertures and sliding it upto, or from the relevant elongated aperture. Hence there is no need to remove the housing from the machine in order to mount or remove a compression roll.

Preferably the housing is provided with a releasably attachable cover for covering the horizontal aperture at the front or rear end of the housing. The cover takes the form of a strut.

More preferably, the compression roll housing is provided with a removable protection plate which when fitted to the housing at least partially covers the horizontal aperture.

In this way, when the compression rolls are being used, crop cannot escape through the horizontal aperture.

According to the invention there is also provided a method of mounting/dismounting a compression roll to/from a compression roll housing of an agricultural machine, said housing having a front and rear end for attachment to parts of the machine, an upper panel, a lower panel and two opposing side panels wherein the compression roll is mountable to and/or removable from the housing by passing through the front or rear end of the housing.

More preferably, the roll passes through the front end of the housing.

Preferably still, the compression roll is slidable from and/or to the front or rear end of the housing along the horizontal aperture located in each of the opposing side panels.

BRIEF DESCRIPTION OF THE DRAWINGS

The invention will now be described with reference to the following drawings in which:

FIG. 2 is a perspective view of the roll housing of FIG. 1 in which the protection plates and one of the vertical struts have been removed, and FIG. 2a is a perspective of the roll housing of FIG. 1 in which the protection plates are removed.

The same reference numerals are given to the same features in each of the drawings.

DETAILED DESCRIPTION OF EXEMPLARY EMBODIMENTS

Figure 1:
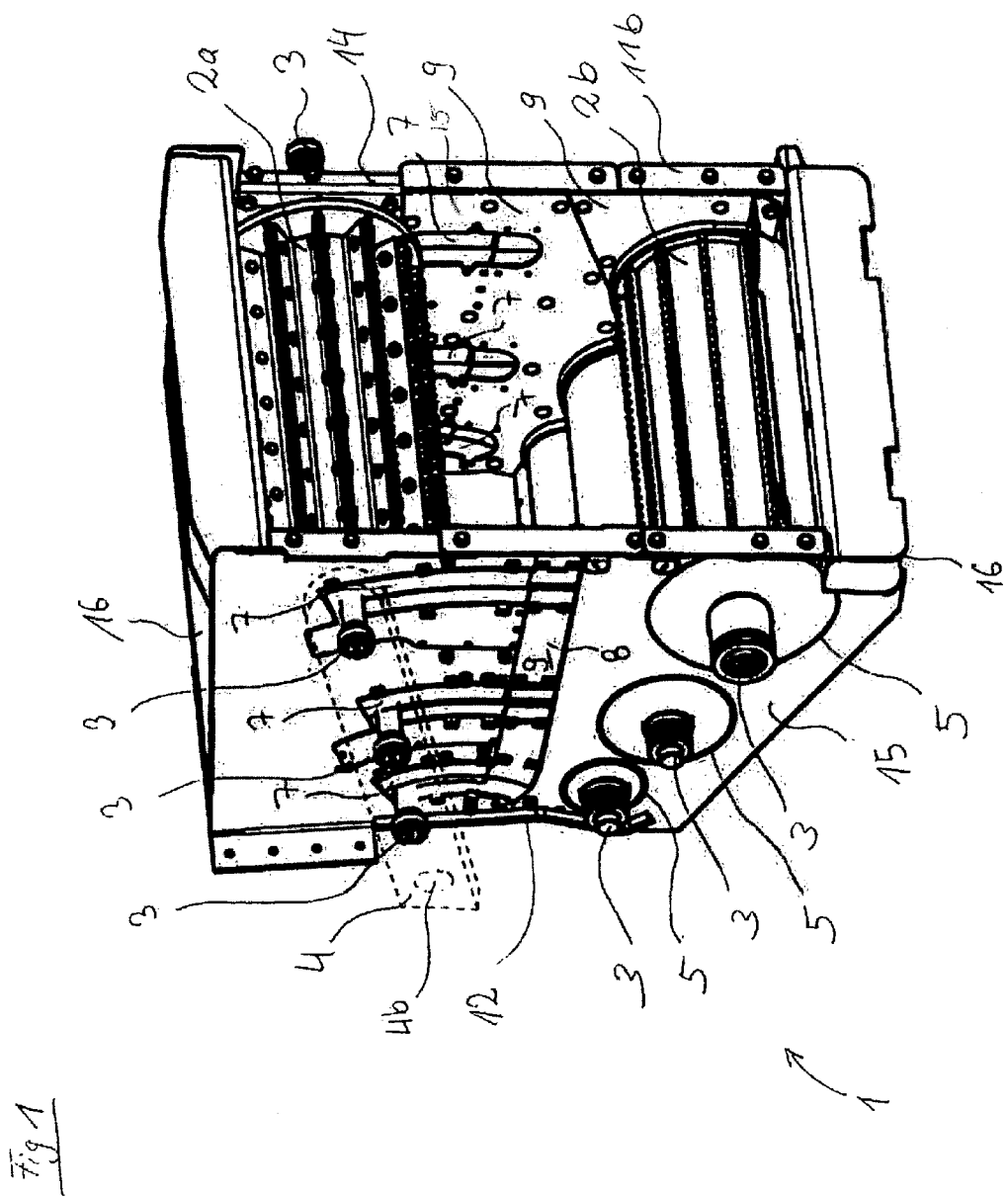
FIG. 1 is a perspective view of a roll housing in accordance with the invention fitted with protection plates.

FIGS. 1 and 2 are perspective views of a compression roll housing 1 for use in an agricultural machine, for example, a forage harvester. The views show the housing 1 as looking into the housing from the front of the housing 11b towards the rear 12. The housing 1 is attached to a forage harvester (not shown) by upper and lower links (not shown). The front end 11b of the housing 1 is attached to a front attachment of the forest harvester (not shown) which may comprise for example, a front cutter for cutting the crop from the stem and a mechanism for feeding the cut crop to the compression roll. The rear end 12 of the housing 1 is attached to a part of the forest harvester which may comprise a knife drum. The crop is cut by the front attachment of the forest harvester and fed into the compression roll housing where it is compressed. It is then fed to the knife drum in the machine where it is cut into predetermined crop elements.

The housing 1 comprises upper and lower panels 16 and two opposing vertical side panels 15. The panels are connected together by welding, or other permanent fixing means. The front end 11b and rear end 12 of the housing 1 is open for connection to a front attachment and the forage harvester respectively.

The housing 1 houses three pairs of compression rolls. Each pair has an upper roll 2a and a lower roll 2b. As shown in FIG. 1, upper rolls 2a are connected by a carrier 4. The two opposing carriers 4 (only one is shown in FIG. 1) each extend across side panels 15. The carriers 4 are provided with transmission elements (not shown) to drive the rolls 2a. Carriers 4 are pivotably mounted about bore 4b to the housing 1 to allow for vertical adjustment of the upper rolls 2a. The compression rolls 2a, 2b comprise a compression drum mounted on a shaft 3. Each of the side panels 15 has three elongated apertures 7 for receiving the shafts 3 of the upper rolls 2a. The side panels 15 are each further provided with three large, rounded apertures 5 for receiving the lower rolls 2b. The elongated apertures 7 are gently curved but substantially vertical. Side panels 15 are also provided with a horizontal aperture 8 which transversely extends across the housing 1 under the elongated apertures 7 to the front end 11b of the housing 1.

In FIG. 1 two vertical protection plates 9 are fitted to the inside of the housing 1 to the two opposing vertical side panels 15. The protection plates 9 can be viewed through the horizontal aperture 8 in the housing 1 in FIG. 1. The form of the plates 9 can be best seen in FIG. 2a where they are removed from the housing 1 opening the horizontal apertures 8.

The plates 9 shown in FIG. 2a comprises three elongated apertures 10 and three arches 11 which correspond to the elongated apertures 7 and lower rolls 2b respectively. When fitted to the housing 1, the plates 9 fit over the horizontal apertures 8 and further define the elongated apertures 7. The elongated apertures 7 and horizontal apertures 8 may be provided with sliders, or covers as shown in FIGS. 1, 2 and 2a, or other means such as brushes, or bristles to prevent crop escaping from the housing. The plates 9 reinforce the side panels 15 of the housing, especially around the elongated apertures 7 and protect the inside of the housing 1 from damage from the crop. The protection plates 9 are simple to re-place when worn. The plates 9 are provided with a flange 28 which are releasably attachable to the front end 11b of the housing 1 by bolts, or other fixing means.

FIG. 2 shows the housing 1 with protection plates 9 removed and one of the vertical struts 14 removed. The vertical struts are releasably attachable to the front end of the housing to provide cover over horizontal apertures 8.

To fit an upper roll 2a mounted to a carrier 4 to the housing 1, the plates 9 and the front vertical supports 14 are removed from the housing 1 opening up aperture 8. Each end of the shaft 3 of an upper roll is placed in the horizontal apertures 8 at the front end of the housing and the roll is slid along the horizontal aperture until the desired elongated aperture 7 is reached whereupon it is pushed upwards and secured within aperture 7. The vertical struts 14 and plates 9 are replaced and secured to the housing. To remove an upper roll 2a mounted to a carrier 4, the struts 14 and plates 9 are removed and the roll 2a mounted to the carrier 4 pushed down the elongated aperture 7 and slid along horizontal aperture 8 to the front end 11b of the housing.

The lower rolls 2b are individually fitted to the housing 1 from the side of the housing by inserting the roll and shaft through the rounded apertures 5 of the side panels 15.

In the embodiment shown in FIGS. 1, 2 and 2a only upper rolls 2a can be assembled and disassembled from the front end 11b of the housing 1 using horizontal apertures 8. It is however possible that further vertical apertures could be made in the lower parts of the side panels 15 so that the lower rolls 2b could also be assembled/disassembled through the front end 11b of the housing using aperture 8.

Alternatively, the rolls 2a, 2b could be assembled/disassembled through the rear end 12 of the housing 12 if the horizontal aperture 8 is extended to the rear of the housing 1.

The invention has the advantage that compression rolls 2a, 2b can be mounted or removed from the housing through the front end of the housing whilst the housing is mounted in the forage harvester thus avoiding the need to remove the housing from the machine.

The invention claimed is:

1. A compression roll housing for an agricultural machine for housing a plurality of compression roller pairs, each pair comprising an upper roll and a lower roll, said housing having opposing front and rear ends for connection to parts of the machine, an upper and a lower panel and two opposing side panels, each of said side panels provided with at least one substantially vertical elongated aperture for receiving a shaft of a compression roll and a horizontal aperture which extends under and across the at least one elongated aperture to the front or rear end of the housing, so that the upper compression rolls are mountable to and removable from the housing by passing through the front or rear end of the housing and along the horizontal aperture.

2. A compression roll housing as claimed in claim 1 wherein the housing is provided with a releasably attachable cover for covering the horizontal aperture at the front or rear end of the housing.

3. A compression roll housing as claimed in claim 1 wherein the housing is provided with a removable protection plate which when fitted to the housing at least partially covers the horizontal aperture.

4. A compression roll housing as claimed in claim 2 wherein the housing is provided with a removable protection plate which when fitted to the housing at least partially covers the horizontal aperture.

* * * * *